UNITED STATES PATENT OFFICE.

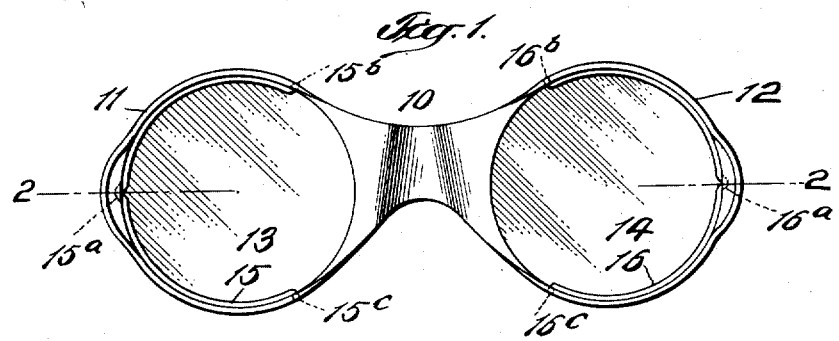
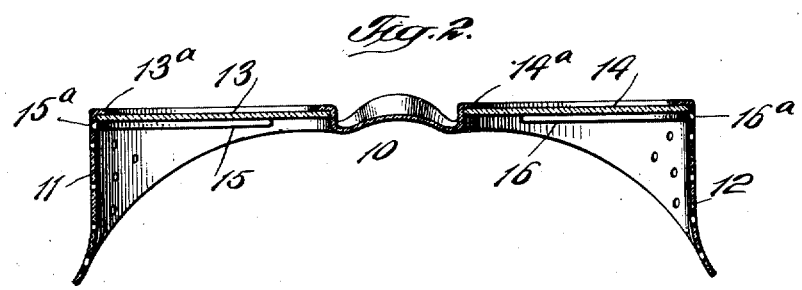
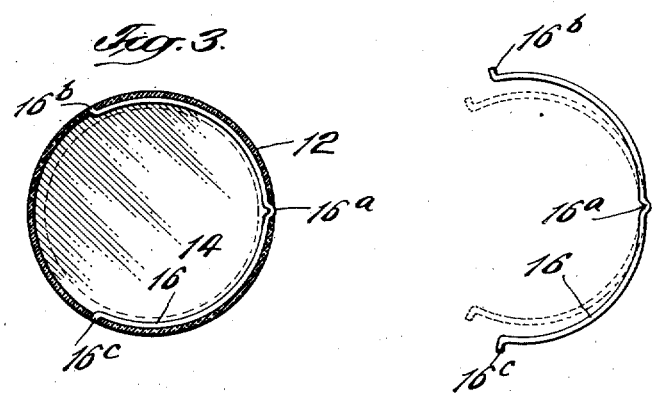
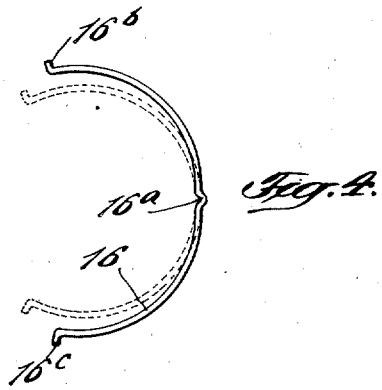

LOUIS DUNKELSBERG, OF BROOKLYN, NEW YORK.

GOGGLES.

1,227,896.  Specification of Letters Patent.  Patented May 29, 1917.

Application filed February 5, 1917. Serial No. 146,656.

*To all whom it may concern:*

Be it known that I, LOUIS DUNKELSBERG, citizen of the United States, and resident of Brooklyn, in the county of Kings and State of New York, have invented a certain new and useful Improvement in Goggles, of which the following is a specification.

My invention relates to an eye guard or shield, to be used by persons engaged in various occupations and is designed to protect the eyes against the action of dust, fumes, gases, grit, etc.

The invention consists in providing an eye guard in which the frame is constructed of suitable material, preferably of celluloid and, is provided with two lens sections connected by a bridge piece, of sufficient flexibility to enable the lenses to assume proper position on the wearer. Each lens portion is so constructed, that it will fit snugly against the flesh of the wearer, around the eye, to exclude dust, dirt, grit or chips and these lenses are sufficiently far apart, with respect to the nose piece or bridge, so as not to impinge on the bridge of the nose, and thus fitting snugly around the eyes, to protect them from material getting between the rim and the flesh, at the side of the nose of the wearer.

The invention further consists in the lenses being held in position from which they can be quickly removed and others substituted, and are held in position by means of a spring, which is provided at each end and in the center, with small projections, that fit into a slot provided in the sides of the wall, and which can be removed by simply pressing the end inwardly, to release the projections, and the glass or lens can be quickly removed and another substituted. The frame is provided at or near the edge with a slot to which an elastic band may be affixed, (not shown) to serve as a strap to hold the goggles in position.

In the accompanying drawings:—

Figure 1 is a front elevation of the eye guard.

Fig. 2 is a cross section on line 2—2 of Fig. 1.

Fig. 3 is a plan view of one section, showing the holding spring in position.

Fig. 4 is a top view of the holding spring, in normal condition, showing the projections and the central portions bent to form a projection for the purposes described.

In the drawing in Fig. 1, 10 is the bridge section, uniting the lens cups 11 and 12, which hold the lenses 13 and 14, which lenses are held in place in the cups 11 and 12 by the springs 15 and 16, the spring 15 being provided at its central portion with an integral outward extension $15^a$, and at one end with an outward extended portion $15^b$ and at its other end with an outward integral portion $15^c$, while the spring 16 is formed with a central outward extension $16^a$ and having an outward extension $16^b$ at one end thereof and a similar extension $16^c$ at its other end, the said extensions formed on each spring being fitted into openings formed in the walls of the lens cups adapted to register with said extensions, whereby the said lenses 13 and 14 are securely seated and held in contact with the inner surface of the annular inward projecting flanges $13^a$ and $14^a$, respectively.

The side walls, 11 and 12, may be perforated if desired as shown, although this is not essential. These walls are flanged and curved in form to fit closely to the face, the ends of which walls are each provided with a slot, to receive a band or strings, to tie at the back of the head to hold the goggles in place.

Having described my invention what I claim is:

1. An eye shield or goggle, made from one piece of material, having lens receiving openings; the bridge piece uniting the two sections, each of said sections having a rearwardly projecting extension, in curved form, to fit closely to the face and having lenses fixed within said openings and held in place by a removable spring, said spring having projections at each end and about the center, that engage with other openings in the frame of the cups to receive the same.

2. An eye shield or goggle, made of a single piece of material having lens receiving openings; the bridge piece uniting the two sections, each section having an inward projecting flange adapted to receive the lenses placed within said openings, and a removable spring carried by each section, each spring having an extension at each end and at its central portion adapted to engage with openings formed in each section, whereby each lens is securely seated and held in contact with the inward projecting flange of each section.

Signed at New York city, in the county of New York and State of New York this 18th day of January, A. D. 1917.

LOUIS DUNKELSBERG.

Witnesses:
G. J. ROSÉN,
BEATRICE ROSENBERG.